Jan. 19, 1971 P. V. PALMQUIST 3,556,637
REFLEX-REFLECTING AGGREGATE AND MARKERS PREPARED THEREFROM
Filed June 27, 1968 2 Sheets-Sheet 1

INVENTOR.
PHILIP V. PALMQUIST
BY Kinney, Alexander,
Sell, Steldt & DeLaHunt
ATTORNEYS Jan. 19, 1971  P. V. PALMQUIST  3,556,637
REFLEX-REFLECTING AGGREGATE AND MARKERS PREPARED THEREFROM
Filed June 27, 1968  2 Sheets-Sheet 2

INVENTOR.
PHILIP V. PALMQUIST
BY Kinney, Alexander,
Sell, Steldt & DeLaHunt
ATTORNEYS United States Patent Office 3,556,637
Patented Jan. 19, 1971

3,556,637
REFLEX-REFLECTING AGGREGATE AND
MARKERS PREPARED THEREFROM
Philip V. Palmquist, Maplewood, Minn., assignor to
Minnesota Mining and Manufacturing Company, St.
Paul, Minn., a corporation of Delaware
Filed June 27, 1968, Ser. No. 740,712
Int. Cl. E01c 23/16; G02b 5/12
U.S. Cl. 350—105
8 Claims

ABSTRACT OF THE DISCLOSURE

Aggregates particularly suitable for use in highway marking and having a spherical lens element of a refractive index below 1.9, a transparent binder coating thereon and, hemispherically embedded in said binder coating, glass beads having a diameter from about 25 to 150 microns and having a refractive index of at least 2.1. These aggregates may be hemispherically embedded in a resinous base having light reflecting properties. A preferred form of the aggregate includes a light reflecting coating on the exposed or non-embedded surfaces of the glass beads.

The present invention relates to reflex-reflecting elements suitable for use in marking highways and other traffic carrying surfaces. In one aspect the invention relates to aggregates which can be dropped onto or carried within a suitable binder or adhesive and which develops reflex-reflection characteristics in actual use.

Although a variety of reflex-reflecting materials and elements have been suggested for use in marking highways, each of these have had certain disadvantages. When ordinary glass beads, such as soda lime silicate glass (refractive index of 1.5) are bonded to the highway surface in a pigmented binder, usually with a white or yellow pigment, light reflected from the highway marking has a brightness of only about three times that of a rough surface white paint, since the pigment tends to diffuse the light striking the glass beads. Such markings are not effective under wet conditions, when driving is most hazardous and the need for efficient light reflecting markings is the most critical. If the glass beads are properly aligned in the binder such that the bead surfaces which are embedded in the binder contain a mirror or specular reflecting material, e.g. vapor deposited aluminum, the efficiency of the bead is extremely low because the path of the light reflected from the mirror surface of the beads is not coincident with the path of the incident light. If a higher refractive index bead is used in a pigmented binder, the reflex-reflective efficiency is higher under dry conditions and even in the presence of a small amount of moisture. However, when the beads are totally submerged in moderate to heavy rainfall, the reflex-reflectivity is essentially destroyed. High index beads with large enough diameters to prevent submersion in a heavy rain are extremely difficult to prepare, since the glass readily divitrifies in manufacture. Another serious disadvantage of the high refractive index glass beads is their tendency to crush or crumble under severe traffic conditions.

In a more recent attempt to solve these problems reflex-reflecting aggregates have been proposed, as illustrated in U.S. Pats. Nos. 3,043,196 and 3,274,888. Such aggregates have a core member carrying on its exterior surface a plurality of high refractive index glass beads and having a specular reflecting material between the high refractive index glass beads and the core member. When the core member is sufficiently large, the aggregates can be made to protrude above the water on the highway during wet road conditions and provide reflex-reflection of light, provided the refractive index of the glass beads are about 1.9 times the refractive index of water, i.e. about 2.25 to 2.5. For adequate reflex-reflection under a variety of conditions, both wet and dry, at least two different types of aggregates are required. However, one of the more serious problems with such aggregates is their loss of effectiveness upon wear. Most highway markers are placed on surfaces over which traffic passes, and this traffic tends to keep the lens surfaces clear of dirt, grease and highway film. Unfortunately, this traffic also tends to remove the small glass beads from the aggregates and to cause the surfaces of the small glass beads on the aggregates to wear. Even if the beads are securely bonded to the core member in the aggregate, a wear of only a few microns changes the spherical shape of the reflex-reflective glass beads, and their value can be quickly destroyed.

In still another approach to these problems glass rods can be appropriately positioned adjacent reflecting surfaces to provide highway markers which can be embedded into the traffic bearing surface, an illustrative marker of this type being shown in U.S. 3,292,507. Although the use of glass rods tends to solve the problem of wear and loss of efficiency under traffic conditions, such glass rods can be cracked under moderate loads, are expensive to manufacture, and must be individually oriented on the highway surface. Many other types of highway reflectors which require special orientation on the highway surface have been proposed, but the expense of their manufacture and especially of their installation have been serious disadvantages.

In the preparation of advertising markers, highway signs and the like the use of a layer of small reflex-reflecting elements, such as glass microspheres associated with specular reflecting surfaces, adjacent larger lens-like formations or elements which are effective to direct incident light to the adjacent reflex-reflecting elements and hence back to the source in a path essentially parallel to the incident radiation have been indicated in U.S. Pats. Nos. 2,294,930 and 2,951,419 (note FIG. 3) and reiterated in U.S. Pat. No. 3,311,441. Unfortunately, the difficulty in manufacturing such constructions, in applying them to traffic carrying surfaces and orienting them in the desired direction, and in providing an optically satisfactory relationship between the reflex-reflecting microspheres with the larger glass lens element has made these approaches impractical for use on load-bearing or traffic surfaces.

It is an object of this invention to provide aggregates, suitable for use on highway and other traffic bearing surfaces, developing a high degree of reflex-reflectivity under both wet and dry conditions. Still another object of this invention is to provide relatively inexpensive aggregates which can be easily installed on or bonded to traffic carrying surfaces to provide reflex-reflective markings having an extended lifetime under severe use without loss of optical efficiency. A further object of this invention is to provide such an aggregate which, without directional orientation on a highway surface, provides a high degree of reflex-reflectivity from all directions.

In accordance with the present invention it has been found that suitable aggregates can be prepared for use in paint compositions or for otherwise bonding to a highway surface, which aggregates can be economically and efficiently prepared and which develop highly desirable, omni-directional reflex-reflecting properties in actual use. The critical selection of such materials and their use in preparing such aggregates will now be described.

Figure 1:
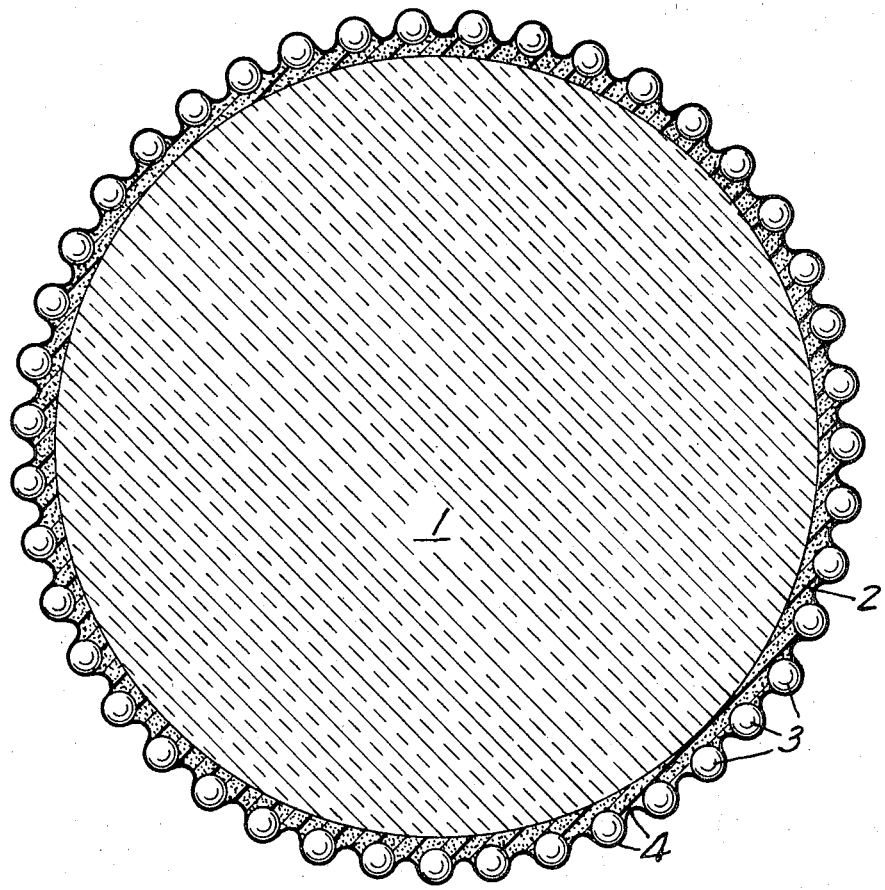
FIG. 1 is a cross-section of the reflex-reflecting aggregates of this invention.
Figure 2:
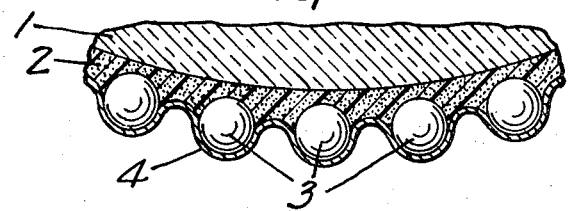
FIG. 2 is an enlarged view of a partial cross-section of the reflex-reflecting aggregate.
Figure 3:
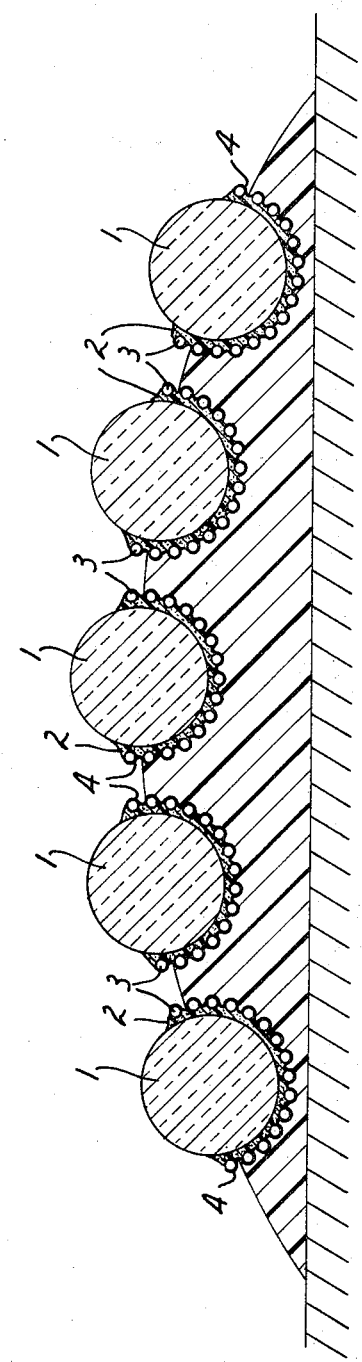

As shown in FIGS. 1 and 2, the aggregate of this invention comprises a spherical lens 1 having a diameter from 40 mils to 1250 mils and a refractive index below about 1.9, preferably below about 1.7, the entire surface of said spherical lens having both a coating of a transparent binder 2 having a refractive index below about 1.6 usually from 1.3 to 1.5, and also, essentially hemispherically embedded in said coating, glass beads 3 having a diameter of from about 25 to about 150 microns and a refractive index of at least 2.1, preferably at least 2.5, In a preferred embodiment a specular or semi-specular reflecting coating 4, such as silver or aluminum, is positioned on the unembedded or exposed surfaces of said glass beads (i.e., those bead surfaces protruding above the transparent binder). The glass beads are desirably closely packed as a monolayer around the spherical lens. Even though the glass beads are essentially hemispherically embedded in the transparent binder, a thin film of binder will still be found to separate the glass beads from the spherical lens element, which is desirable because of the adverse effect of an air-glass interface on the optical efficiency of the system. The ratio of the refractive index of the glass beads to the bead binder is desirably greater than about 1.75 and preferably less than 2.0.

Although plastic materials could be used as the spherical lens, glass spheres are preferable because of their low cost and generally better physical properties, such as toughness, hardness, high crushing strength, etc. In order to develop wet reflection under normal highway surface conditions the diameter of the spherical lens element should be at least 40 mils, preferably 100 mils or more. Usually a spherical lens diameter of no greater than about 500 mils can be recommended (most preferably about 250 mils), since larger lens elements require greater quantities of material to effectively bond them to the highway surface and can be more readily removed from highway surfaces by traffic flow, snow plows and the like. For the high refractive index glass beads bonded to the spherical lens element, any of the many high refractive index glass formulations which provided transparent glasses, either clear or colored, may be used, and the technology for such glass bead manufacture is well known. Although clear glass beads are preferred, it is practical in some cases to use colored glass beads, particularly when marking highway centerlines for no-passing zones. Alternatively the desired color may be achieved by using an appropriately colored spherical lens or a colored binder (e.g. a binder containing dissolved colored dye) for the glass beads.

Maximum brilliance of retro-reflected light generally requires that the binder into which the high index beads are embedded have an index of refraction between 1.3 and 1.5, as mentioned earlier, and further that such binder be transparent, i.e. essentially free of light diffracting or diffusing impurities. Suitable materials include low refractive index polymers, such as copolymers of perfluoropropene and vinylidene fluoride ("Viton-A," trademarked product of E. I. du Pont de Nemours and Company; "Fluore," trademarked product of Minnesota Mining and Manufacturing Company) and mixtures thereof with other materials (e.g. polyethyl methacrylate) to impart better workability, scratch resistance and/or index of refraction. When mixtures of various binders are used, the refractive index of the resulting mixture should be maintained below about 1.6, as mentioned earlier.

In forming the aggregates of this invention the spherical lens elements are mixed with a solution of the low index binder material until all lens elements are coated. The coated spheres are then passed through a vibrating screen onto a fluidized or moving bed of high index glass beads which have previously been coated with an imperceptibly thin surface coating of an oleophobic fluorocarbon sizing agent (as described in U.S. 3,222,204, issued Dec. 7, 1965, Victor Weber and John T. Tomlinson), providing a monolayer of beads immersed in and adhered to the wet or tacky binder coating. The resulting bead coated spheres are screened and cured at 150° F. for 5 minutes, then at 200° F. for 5 minutes and finally at 300° F. for 7 minutes. The particular temperatures and cure times used depend on the properties of the binder selected, the foregoing cure cycle being particularly useful with a copolymer of perfluoropropene and vinylidene fluoride (20/80 mol percent, respectively). The purpose of the curing cycle is to remove any remaining solvent from the binder layer, to permit the beads to penetrate the binder layer up to approximately ½ of their diameter (i.e. from 40 to 65% immersion), and to develop a good bead-binder bond. The use of glass beads which contain an oleophobic fluorocarbon surface treatment permits a more economical and efficient use of the glass beads, since the beads are not as readily wetted by the binder and, in effect, "float" on the binder layer during the cure cycle. As a result, after the cure cycle is completed a relatively closely packed monolayer of the glass beads is produced, essentially all of which are about ½ embeded (i.e., essentially hemispherically embedded) in the cured binder layer.

The abovementioned aggregates are most conveniently bonded to a highway surface with a resin or paint film, a quick drying paint or resin being preferred. Any paint or binder resin which developes adequate adhesion to the highway surface and has good resistance to wear and weathering can be used, and epoxy resins are outstanding for this purpose. The thickness of the paint layer and the size of the aggregates can be controlled so that the aggregates are essentially half submerged in the dry paint film. If the surface of the aggregates is coated with a thin film of oleophobic fluorocarbon, as by using the procedures of U.S. 3,222,204, the aggregates can be made to float on the paint. In this manner the thickness of the paint film thus can be varied widely without fear that the aggregates will become totally submerged in the paint or that the paint will form a film over the aggregate by capillary action. Although the aggregates may be added to the paint and the mixture applied to the highway surface, it is generally more convenient to drop the aggregates onto or partially embed them into a wet or tacky paint film previously provided on the surface to be marked. As mentioned earlier, in the preferred embodiment the exposed surfaces of the high refractive index glass beads in the aggregates are coated with a specular or semi-specular reflecting material, such as silver, vapor deposited aluminum, aluminum flake, etc. However, in an alternative embodiment the light reflective, i.e. specular or semi-specular, coating on the high refractive index beads is omitted, and the aggregates are effectively used in a light reflecting resinous base, e.g. a paint containing a semi-specular pigment (e.g. aluminum flake, etc) or a non-specular, light reflecting pigment (e.g. titanium dioxide, etc.).

EXAMPLE 1

100 parts by weight of glass spheres of about 185 mils diameter, categorized as non-precision glass balls, having a hard smooth surface, average crushing strength of 712 pounds and an index of refraction about 1.51, were thoroughly mixed with 2 parts by weight of a solution of 1 part 80/20 mol ratio vinylidene fluoride/perfluoropropene elastomeric copolymer (refractive index 1.378) in 2 parts of methyl isobutyl ketone until all of the glass balls were coated. The resulting coated balls or spherical lens elements were then passed through a vibrating screen having 0.75 inch openings onto a fluidized or vibrated bed of glass beads having average diameter between 25 and 37 microns and a refractive index of 2.67. These glass beads had previously been treated with 0.56 weight percent solution in water-isopropanol (98.5% water) of a chromium complex of a perfluorinated compound (1 mol of a mixture of N-ethyl-N-perfluorooctane-sulfonyl glycine and perfluorooctanesulfonic acid and 3 mols of chromium hydroxychloride), which is shown in U.S. 3,222,204. A monolayer of glass beads was adhered to the copolymeric binder layer on the glass balls. The resulting aggregate was then cured at 150° F. for 5 minutes, at 200° F. for 5 minutes and at 300° F. for 7 minutes, and the cured product was vapor coated with a specular reflecting coating of aluminum. A highway marker was made by embedding these aggregates, preferably to about ½ their diameter in a suitable holding media, such as epoxy resin, which has good weather resistant properties. After the resinous holding media was fully cured or set the exposed areas of the aggregates were buffed and wiped with methyl isobutyl ketone until the high index glass beads were removed and the surface of the glass sphere was exposed. For most purposes, when the resulting aggregates and markers prepared therefrom, are designed for use on traffic or load-bearing surfaces it is unnecessary to expose the surface of the spherical lenses by removing the coated glass beads from the outer lens surface, since the normal wear caused by traffic flow rapidly accomplishes the same result.

EXAMPLE 2

100 parts by weight of glass spheres of 250 mils diameter, categorized as non-precision glass balls of a composition similar to Example 1, were mixed with 1 part by weight of a solution prepared by blending a solution of 3 parts by weight of the fluorinated elastomer of Example 1 in 6 parts of methyl isobutyl ketone and a solution of 1 part by weight of polyethyl methacrylate (refractive index of 1.49, intrinsic viscosity of about 0.75 at 25° C.) in 2 parts of xylol. The spheres were thoroughly mixed in the resulting solution until they were uniformly coated with the binder solution. The wet coated spheres were passed through a vibratory screen having ¾ inch openings onto a fluidized bed of high index glass beads having a refractive index of 2.67 and an average diameter between 25 and 37 microns. The high index glass beads had previously been treated with fluorochemical compound in the same manner as described in Example 1. A monolayer of glass bears was thus adhered to the binder layer on the glass spheres. The cure cycle and the subsequent coating of the hemispherically exposed or non-embedded high index head surfaces with aluminum were conducted as in Example 1. Resulting aggregates were useful in preparing reflex-reflective highway markers.

EXAMPLE 3

100 parts by weight of glass spheres of 250 mils diameter (non-precision glass spheres as in Example 1) were mixed thoroughly with 1 part by weight of the following binder solution:

|   | Percent by weight |
|---|---|
| 1 part of the fluorinated elastomer of Example 1 in 2 parts methyl isobutyl ketone | 90 |
| 1 part of the polyethyl methacrylate of Example 2, 2 parts xylol | 10 |

The mixing was continued until the spheres were uniformly coated with the binder solution, then the wet coated spheres were passed through a vibratory screen having a 0.75 inch opening onto a fluidized bed of glass beads having a refractive index of 2.65 and an average diameter from 37 to 53 microns. The high refractive index glass beads had previously been treated with a fluorochemical compound, as described in Example 1. A monolayer of glass beads was thus adhered to the binder layer on the glass spheres, and the resulting aggregate was cured as in Example 1. The cured aggregates were embedded slightly over their equators in a binder resin consisting of 50 parts by weight of epoxy resin ("Epon 828," a trademarked product of Shell Chemical Company, epoxide equivalent of 175–210, viscosity at 25° C. of 100–160 poises), 50 parts by weight of "Versamid 125" (a trademarked product of General Mills Company), a condensation product of a polyamine and a dicarboxylic acid, amine value of 345, viscosity of 8 poises at 75° C., and 1 part by weight of aluminum flakes. The composite highway marker was cured at 150° F. for 30 to 45 minutes. The aluminum flakes provided a semi-specular surface adjacent the embedded high refractive index beads of the aggregates.

EXAMPLE 4

Following the same procedure as in Example 3, except for the use of 100 parts by weight of titanium dioxide in place of the 1 part by weight of aluminum flakes, an efficient highway marker was prepared. When the glass beads were removed from the unembedded portions of the aggregates, the highway marker displayed effective reflex-reflective properties.

Various other embodiments of the present invention will be apparent to those skilled in the art without departing from the scope thereof.

What is claimed is:

1. An aggregate comprising a spherical lens having a diameter from about 40 mils to about 1250 mils and a refractive index below 1.9, the entire surface of said spherical lens having both a coating of a transparent binder having a refractive index below about 1.6 and also, essentially hemispherically embedded in said coating, glass beads having a diameter from about 25 to about 150 microns and having a refractive index of at least 2.1, a light reflecting coating being contained only on the unembedded surface of said glass beads.

2. The aggregate of claim 1 in which said light reflecting coating is a specular or semi-specular light reflecting coating.

3. The aggregate of claim 1 in which said embedded glass beads are embedded essentially as a monolayer.

4. A highway marker which comprises a resinous base into which is partially embedded the aggregate of claim 1.

5. A highway marker which comprises a resinous base into which is about hemispherically embedded the aggregate of claim 1.

6. A reflex-reflective marker which comprises a substrate into which is essentially hemispherically embedded aggregates substantially all of which comprise a spherical lens having a diameter from about 40 mils to about 1250 mils and a refractive index below 1.9, the embedded portion of said spherical lens having both a surface coating of a transparent binder having a refractive index from about 1.3 to 1.5 and also, essentially hemispherically embedded in said transparent binder coating, glass beads of a diameter from about 25 to about 150 microns having a refractive index of at least about 2.5, the surfaces of said glass beads which are unembedded in said binder coating being adjacent a light reflecting material, and the unembedded portion of said spherical lens being substantially free of glass beads.

7. The reflex-reflective marker of claim 6 in which said unembedded surface of said glass beads have a specular or semi-specular light reflecting coating thereon.

8. The reflex-reflective marker of claim 6 in which said light reflecting material comprises light reflecting particulate material in said resinous base.

References Cited

UNITED STATES PATENTS

| 3,043,196 | 7/1962 | Palmquist et al. | 350—105 |
| 3,175,935 | 3/1965 | Vanstrum | 350—105X |
| 3,222,204 | 12/1965 | Weber et al. | 117—27 |
| 3,254,563 | 6/1966 | De Vries et al. | 350—105 |
| 3,050,824 | 8/1962 | Lemelson | 350—105X |
| 3,154,872 | 11/1964 | Nordgren | 350—105X |
| 3,252,376 | 5/1966 | De Vries | 350—105 |
| 3,311,441 | 3/1967 | Gill | 350—105 |

PAUL R. GILLIAM, Primary Examiner

U.S. Cl. X.R.

94—1.5

UNITED STATES PATENT OFFICE
CERTIFICATE OF CORRECTION

Patent No. 3,556,637   Dated January 19, 1971

Inventor(s) Philip V. Palmquist

It is certified that error appears in the above-identified patent and that said Letters Patent are hereby corrected as shown below:

Column 3, line 59, "Fluore," should read --"Fluorel,"--. Column 5, line 41, "bears" should read --beads--. Column 5, line 44, "head" should read --bead--.

Signed and sealed this 25th day of May 1971.

(SEAL)
Attest:

EDWARD M. FLETCHER, JR.
Attesting Officer

WILLIAM E. SCHUYLER, JR.
Commissioner of Patents